S. Beers.
Odometer.
Nº 1,326.  Patented Sep. 14, 1839.
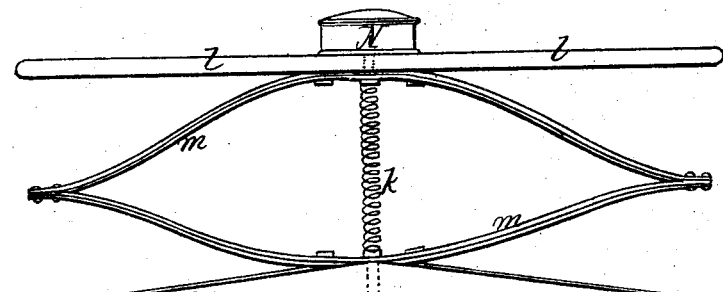
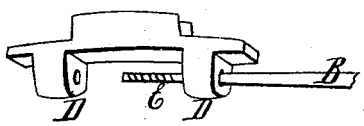
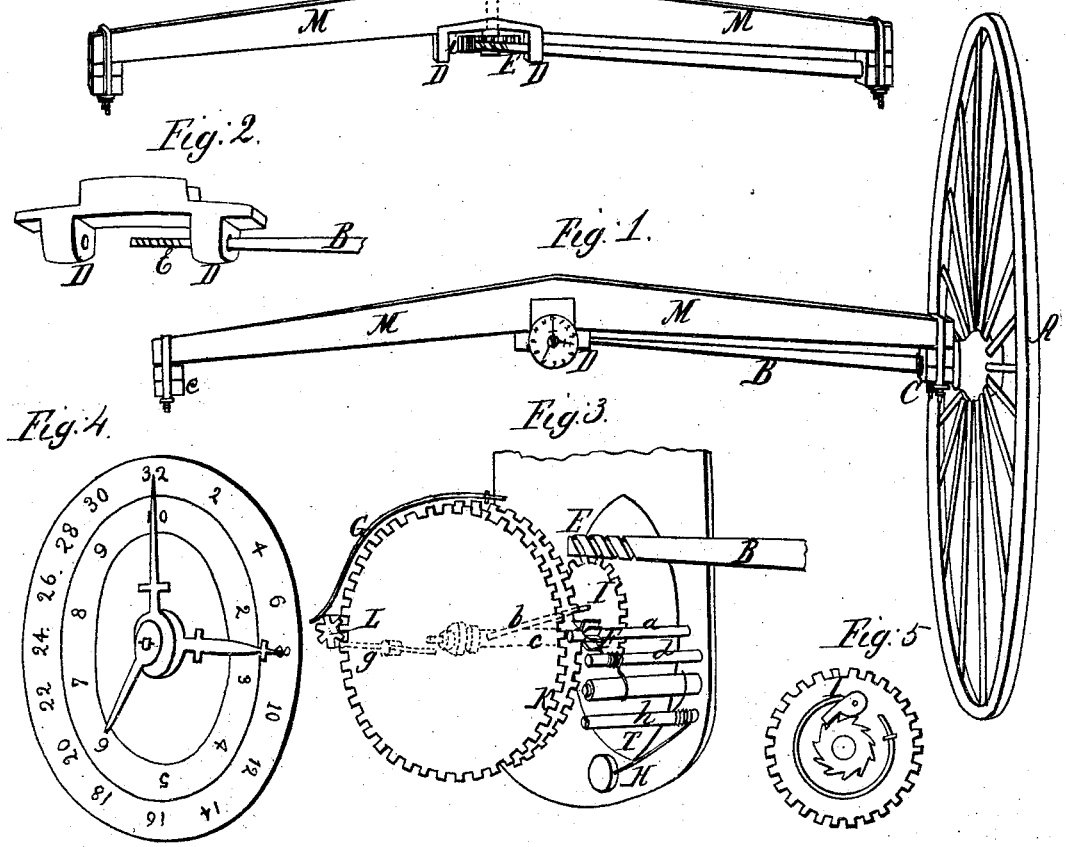
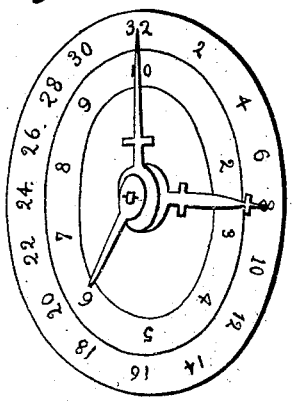

UNITED STATES PATENT OFFICE.

SMITH BEERS, OF WATERBURY, CONNECTICUT.

ODOMETER OR MACHINE FOR RECORDING THE DISTANCE TRAVELED BY WHEEL-CARRIAGES.

Specification of Letters Patent No. 1,325, dated September 14, 1839.

*To all whom it may concern:*

Be it known that I, SMITH BEERS, of Waterbury, in the county of New Haven and State of Connecticut, have made certain Improvements in Odometers or Machines for Recording the Distance Traveled by Wheel-Carriages; and I do hereby declare that the following is a full and exact description thereof.

I usually attach each of the wheels of the carriage on a distinct axle, or shaft, to which the hub of the wheel is firmly affixed, in the manner shown in Figure 1, of the accompanying drawing, where A, is a wheel attached to the axle, or shaft, B, running in boxes at C, near the hub, the inner end of each shaft having its bearing in a collar D, attached to the bed piece M, of the carriage.

Fig. 2, is an enlarged representation of a metallic bearing piece, which may be attached to the lower side of the bed piece M, and of which the collars D, D, make a part. On the inner end of the axle B, there is an endless screw E, which is to act upon a toothed, or worm, wheel, by which the odometer is to be actuated. A similar effect may be produced by means of a continuous axle, having an endless screw on its middle, or on such part thereof as may be preferred, for giving motion to the odometer. In this case, one of the wheels should be fast upon the axle, and the other loose, to admit of their revolving independently.

Fig. 3, is a representation of the wheel-work of my odometer, B, being the axle having the endless screw E, upon it, which gears into, and turns, the wheel I, by which motion is communicated to the other wheels and pinions used, and, consequently, to the indexes. The wheel I, has a pawl and ratchet by which it is permitted to move backward on the main, or center, arbor, on which it is placed, so that no retrograde motion of the hands shall take place in the backing of the carriages d'.

The number of teeth upon the wheels must, of course, be governed by the size of the carriage wheel by the revolution of which they are to be driven. For the purpose of definite description, I will suppose the circumference of the carriage wheel to be eleven feet; the driving wheel I, should then have fifteen teeth, and the endless screw E, being single threaded, the wheel will, in this case, revolve once in every ten rods traveled.

Upon the same center arbor upon which I, is placed, is a second wheel J, which has thirty two teeth. This wheel is fixed upon a tube, or socket, which is free upon the center arbor. The teeth of this wheel gear into a pinion upon the arbor a, by which pinion it is to be moved to the distance of one tooth at every revolution of the wheel I; this revolution is effected in the following manner. A pin, or arm, b, represented in dotted lines, projects from the arbor c, (also represented by dotted lines) which is carried by the wheel I, and this arm, as it revolves, comes into contact with one of the leaves of the pinion, or the arbor a, and turns it, and the wheel J, one tooth, the leaves of the pinion extending down below the wheel J, for that purpose. A pin and spring at F, attached to the arbor d, serve as a stop to hold the pinion in place, a spring similar to that at G, to be presently noticed will answer the same purpose. By this arrangement, the wheel J, will revolve once in thirty two revolutions of the wheel I, indicating a distance of thirty two rods, or one mile. The third wheel K, is fixed upon a tube, or socket, which is free upon the socket of J, and may, like it, have thirty two teeth. It plays into a pinion at L, which is checked, or held in place, by a spring G. A pin, or arm, represented by the dotted line g, is carried by a stud on the face of the wheel J, and acts upon the pinion L, so as to turn the wheel K, the distance of one tooth in every revolution of J, thus causing it to revolve once in every thirty two miles. Upon the same principle, a fourth wheel, if desired, may be added.

T, is a bell, which may be struck by a hammer H, upon the arbor h, actuated by a pin on the wheel J, and thus indicate the miles. The dial plate, Fig. 4, under this arrangement, will show, by means of the respective indexes carried by the three wheels, to the extent of thirty two miles, together with the rods, and tenths of a rod, which have been traveled. At starting, the indexes should all be moved forward, by hand, so as to point to 32. The upper plate of the frame-work, and the inclosure of the sides of the apparatus, are omitted in the drawing, for the purpose of exhibiting its construction.

In Fig. 1, the apparatus is represented as attached to the bed piece M, of the carriage, with the dial plate standing vertically, the wheel I, being actuated directly by the axle B, as shown in Fig. 3. I, usually, however, place the apparatus upon the hind part of the body of the carriage, above the springs, the dial standing horizontally, and the works thereby secured from being injured by the vibration of the carriage. This mode of arrangement is shown in Fig. 6. The axle B, carrying the endless screw, plays into a horizontal worm-wheel $i$ attached to a vertical shaft, or arbor, revolving in the bed piece M, M; to the upper end of this shaft, is attached a spiral, zig-zag, or other, spring $k$, which carries a shaft, or arbor, at its upper end, passing through the piece $l, l$, attached to the carriage body, and thus actuates the machinery contained in the box N. The spring $k$, plays up and down with the elliptic, or other, springs $m, m$, of the carriage, while it operates as an arbor, or shaft, to drive the machinery.

What I claim as my invention, and desire to secure by Letters Patent, in the herein described apparatus is—

1. The particular manner of constructing the wheel work thereof, by means of which all the indexes employed turn upon one common center; said particular construction consisting in the special manner in which are combined the wheels and pinions, and the respective arms by which the pinions are moved.

2. I also claim the combination with such an apparatus, of the spring $k$, instead of the slides heretofore employed, for communicating motion from the axle of the carriage, to the wheel-work, placed above the carriage springs, as set forth.

SMITH BEERS.

Witnesses:
 THOS. F. JONES,
 WILLIAM DE BEARDSLEY.